United States Patent
Boyer et al.

(10) Patent No.: US 11,910,794 B2
(45) Date of Patent: Feb. 27, 2024

(54) SOLUTIONS AND METHODS FOR LONG-TERM POLLEN STORAGE

(71) Applicant: Monsanto Technology LLC, St. Louis, MO (US)

(72) Inventors: Zachary Boyer, Fenton, MO (US); Benjamin T. Julius, Saint Charles, MO (US); Dennis Moore, Florissant, MO (US); Yuechen Zhu, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 17/680,781

(22) Filed: Feb. 25, 2022

(65) Prior Publication Data
US 2022/0279778 A1    Sep. 8, 2022

Related U.S. Application Data

(60) Provisional application No. 63/158,326, filed on Mar. 8, 2021.

(51) Int. Cl.
*A01G 7/06* (2006.01)
*A01N 3/00* (2006.01)

(52) U.S. Cl.
CPC ..................... *A01N 3/00* (2013.01)

(58) Field of Classification Search
CPC ............. A01H 1/027; A01N 3/00; A01G 7/00
See application file for complete search history.

(56) References Cited

U.S. PATENT DOCUMENTS

| | | | |
|---|---|---|---|
| 6,303,587 B1 | 10/2001 | Yvin et al. | |
| 8,299,335 B2 | 10/2012 | Malvar et al. | |
| 8,952,217 B2 | 2/2015 | Puzio et al. | |
| 10,750,711 B2 | 8/2020 | Djonovic et al. | |
| 10,913,937 B2 | 2/2021 | Edlund | |
| 11,653,604 B2 | 5/2023 | Larue et al. | |
| 11,730,099 B2 | 8/2023 | Boyer et al. | |
| 2012/0171251 A1 | 7/2012 | Asari et al. | |
| 2015/0093442 A1 | 4/2015 | Kaneko et al. | |
| 2015/0257345 A1 | 9/2015 | Brown | |
| 2019/0008144 A1 | 1/2019 | Etter et al. | |
| 2019/0100763 A1 | 4/2019 | Kelliher et al. | |
| 2019/0150383 A1 | 5/2019 | Ketkar et al. | |
| 2021/0092920 A1 | 4/2021 | Larue et al. | |
| 2021/0092961 A1 | 4/2021 | Barry et al. | |
| 2021/0307273 A1 | 10/2021 | Boyer et al. | |
| 2022/0110318 A1 | 4/2022 | Arling et al. | |
| 2022/0338432 A1 | 10/2022 | Larue et al. | |
| 2022/0400637 A1 | 12/2022 | Borrowman et al. | |
| 2023/0329166 A1 | 10/2023 | Larue et al. | |

FOREIGN PATENT DOCUMENTS

| | | | |
|---|---|---|---|
| WO | 1990014000 | 11/1990 | |
| WO | 2020055647 | 3/2020 | |
| WO | WO 2020/055647 | * 3/2020 | ............... A23B 7/16 |

OTHER PUBLICATIONS

Wolkers et al (Principles Underlying Cryopreservation and Freeze-Drying of Cells and Tissues. In: Wolkers, W.F., Oldenhof, H. (eds) Cryopreservation and Freeze-Drying Protocols. Methods in Molecular Biology, vol. 2180, Chapter 1, pp. 3-25, 2021. First Online: Aug. 15, 2020 (Year: 2021).*
Karun et al. CyroLetters 35(5): 407-417 (Year: 2014).*
Barnabas, et al. Storage of maize (*Zea mays* L.) pollen at −196° C. in liquid nitrogen. Euphytica 25, 747-752 (1976).
Barnabas, et al. Fertility of Deep-frozen Maize (*Zea mays* L.) Pollen. Pollen, Annals of Botany, vol. 48, Issue 6, pp. 861-864, Dec. 1981.
Barnabas, et al. Effect of Water Loss on Germination Ability of Maize (*Zea mays* L.) Pollen. Annals of Botany, vol. 55, Issue 2, pp. 201-204, Feb. 1985.
Barnabas, et al. Effect of pollen storage by drying and deep-freezing on the expression of different agronomic traits in maize (*Zea mays* L.). Euphytica 39, 221-225 (1988).
Barnabas. Preservation of Maize Pollen. In: Bajaj, Y.P.S. (eds) Maize. Biotechnology in Agriculture and Forestry, vol. 25. Springer, Berlin, Heidelberg. (1994).
Buitink, et al. Calorimetric Properties of Dehydrating Pollen (Analysis of a Desiccation-Tolerant and an Intolerant Species). Plant Physiology, vol. 111, Issue 1, pp. 235-242, May 1996.
Gorla, et al. Genetic variability of gametophyte growth rate in maize. Theoret. Appl. Genetics 46, 289-294 (1975).
Greenspan. Humidity Fixed Points of Binary Saturated Aqueous Solutions. Journal of Research of the National Bureau of Standards—A. Physics and Chemistry, vol. 81A, No. 1, pp. 89-96, Jan.-Feb. 1977.

(Continued)

*Primary Examiner* — Keith O. Robinson
(74) *Attorney, Agent, or Firm* — Dentons US LLP; Christopher Luzecky (57) ABSTRACT

The invention provides novel solutions and methods for storage and delivery of pollen to a female reproductive part of a recipient plant. The pollen storage solution provided includes a solute that maintains the tonicity of the pollen storage solution at a concentration between about 0.5 M and about 3.0 M and a cryoprotectant. The methods provided include storing the pollen storage solution and applying pollen stored in the storage pollen solution to at least a first female reproductive part of a recipient plant, thereby pollinating the female reproductive part with the stored pollen from the donor plant.

26 Claims, 2 Drawing Sheets

(56) References Cited

OTHER PUBLICATIONS

International Search Report and Written Opinion regarding International Application No. PCT/US22/18637, dated Jul. 1, 2022.
Nath, et al. Effect of freezing and freeze-drying on the viability and storage of *Lilium longiflorum* L. and *Zea mays* L. pollen. Cryobiology vol. 12, Issue 1, 81-88 (1975).
Pacini, et al. Pollen Developmental Arrest: Maintaining Pollen Fertility in a World With a Changing Climate. Front. Plant Sci., May 24, 2019.
Rauf, et al. Advances in Plant Breeding Strategies: Agronomic, Abiotic and Biotic Stress Traits. Springer, Cham. (2016).
U.S. Appl. No. 17/680,791, filed Feb. 25, 2022, Borrowman et al.
U.S. Appl. No. 17/762,658, filed Mar. 22, 2022, Larue et al.
U.S. Appl. No. 18/179,970, filed Mar. 7, 2023, Larue, et al.

\* cited by examiner

SOLUTIONS AND METHODS FOR LONG-TERM POLLEN STORAGE

REFERENCE TO RELATED APPLICATION

This application claims the benefit of United States Provisional Application No. 63/158,326, filed Mar. 8, 2021, which is herein incorporated by reference in its entirety.

FIELD OF THE INVENTION

The present disclosure relates to the field of agricultural biotechnology, and more specifically to solutions and methods for long-term pollen storage.

BACKGROUND OF THE INVENTION

Pollen viability is influenced by environmental conditions and may decrease rapidly once shed. Methods to improve pollen viability and fertility following pollen storage would have significant value to the agricultural industry. Corn (*Zea mays*; also known as maize), rice (*Oryza sativa*), wheat (*Triticum aestivum*), and sorghum (*Sorghum bicolor*), which belong to the Poaceae family of plants, are examples of economically important agricultural crops in which breeding has been hampered by low efficiency procedures for long-term pollen storage. Pollen of plants from the Poaceae family is classified as recalcitrant or desiccation sensitive. Other non-limiting examples of recalcitrant pollen include pollen from certain species in the Alismataceae, Amaranthaceae, Cactaceae, Chenopodiaceae, Cucurbitaceae, Anacardiaceae, Portulacaceae, Urticaceae, Lauraceae, Liliaceae, Iridaceae, Orchidaceae, Acanthaceae, and Caryophyllaceae families. The long-term storage of pollen from such crops would provide significant advancements over the current state of the art in the fields of breeding and hybrid seed production. Successful long-term storage would allow breeders to conduct crosses between parents grown at different times and in different regions, which would significantly improve workflow and expand progeny diversity.

SUMMARY

In one aspect, a pollen storage solution is provided herein comprising: (a) pollen; (b) a solute that maintains the tonicity of the pollen storage solution at a concentration between about 0.5M and about 3.0M; and (c) a cryoprotectant, wherein the solute is impermeable to the pollen in the solution and wherein the cryoprotectant is permeable to the pollen in the solution. In one embodiment, the solute is further defined as a monosaccharide, a disaccharide, a polysaccharide, a polyhydric alcohol, or a polyethylene glycol solute. Non-limiting examples of such solutes include glucose, fructose, galactose, sucrose, lactose, maltose rehalose, cellobiose, chitobiose, kojibiose, nigerose, isomaltose, trehalose, sophorose, laminaribiose, gentiobiose, trehalulose, turanose, maltulose, leucrose, isomaltulose, gentiobiulose, mannobiose, melibiose, melibiulose, rutinose, rutinulose, xylobiose, maltotriose, melezitose, nigerotriose, maltotriulose, raffinose, kestose, maltodextrin, starch, glycogen, galactogen, cellulose, chitin, pectin, peptidoglycan, mannitol, sorbitol, xylitol, lactitol, isomalt, maltitol, sodium chloride, and polyethylene glycol. In one illustrative embodiment, the pollen storage solution is defined as an aqueous solution. In another embodiment, the pollen storage solution is defined as an isotonic solution. In still yet another embodiment, the solute is present in the solution at a concentration of between about 0.5M and about 3.0M. In particular embodiments, the solute may be present in the solution, for example, at a concentration of about 0.5M, 1.0M, 1.5M, 2.0M, 2.5M, or 3.0M, including all ranges derivable therebetween. In one embodiment, the cryoprotectant is selected from the group consisting of ethylene glycol, dimethyl sulfoxide, butanediol, propylene glycol, betaine, acetamide, formamide, and glycerol. In another embodiment, the cryoprotectant is present in the solution at a concentration between about 0.5M and about 5.0M. The cryoprotectant may be present in the solution, for example, at a concentration of about 0.5M, 1.0M, 1.5M, 2.0M, 2.5M, 3.0M, 3.5M, 4.0M, 4.5M, or 5.0M, including all ranges derivable therebetween. In yet another embodiment, the pollen in the pollen storage solution is further defined as pollen from a monocot plant or as recalcitrant pollen. In still yet another embodiment, the pollen is from a cereal plant. Non-limiting examples of such cereal plants include corn, rice, wheat, and sorghum plants. In one embodiment, the pollen storage solution further comprises a component selected from the group consisting of an amino acid, a lipid, a vitamin, an electrolyte, a macronutrient, a micronutrient, an energy source, a buffer, a cytokinin, an auxin, an organic extract, and a gibberellin.

In another aspect, the present disclosure provides a method for storing pollen, the method comprising storing pollen in a pollen storage solution comprising: (a) pollen; (b) a solute that maintains the tonicity of the pollen storage solution at a concentration between about 0.5M and about 3.0M; and (c) a cryoprotectant; wherein the solute is impermeable to the pollen in the solution and wherein the cryoprotectant is permeable to the pollen in the solution. In one embodiment, the solute is further defined as a monosaccharide, a disaccharide, a polysaccharide, a polyhydric alcohol, or a polyethylene glycol solute. In one embodiment, the cryoprotectant is selected from the group consisting of ethylene glycol, dimethyl sulfoxide, butanediol, propylene glycol, betaine, acetamide, formamide, and glycerol. In another embodiment, the storing is performed at a temperature between about −196° C. and about −60° C. or at a temperature between about −196° C. and −70° C. The storage temperature may be, for example, about −196° C., −180° C., −160° C., −140° C., −120° C., −100° C., −80° C., −70° C., or about −60° C., including all ranges derivable therebetween. In yet another embodiment, the storage temperature is about −76° C. In still yet another embodiment, the storing is performed for up to about 10 years. In one embodiment, the storing is performed for at least about 15 minutes, 1 hour, 1 day, 1 week, 1 month, 6 months, 1 year, 2 years, 5 years, or 7 years, including all ranges derivable therebetween. In another embodiment, at least about 5% of pollen grains in the solution remain capable of germination on a stigma following the storing.

In yet another aspect, the present disclosure provides a method for pollinating a plant, the method comprising the steps of: (a) obtaining pollen that has been stored in a pollen storage solution comprising: (i) a solute that maintains the tonicity of the pollen storage solution at a concentration between about 0.5M and about 3.0M; and (ii) a cryoprotectant, wherein the solute is impermeable to the pollen in the solution and wherein the cryoprotectant is permeable to the pollen in the solution; and (b) pollinating the plant with the pollen. In one embodiment, the solute is further defined as a monosaccharide, a disaccharide, a polysaccharide, a polyhydric alcohol, or a polyethylene glycol solute. In another embodiment, the cryoprotectant is selected from the group consisting of ethylene glycol, dimethyl sulfoxide, butanediol, propylene glycol, betaine, acetamide, formamide, and glycerol. In yet another embodiment, the pollen storage solution was stored for up to about 10 years prior to the pollinating. In still yet another embodiment, the pollen storage solution was stored for at least about 15 minutes, 1 hour, 1 day, 1 week, 1 month, 3 months, 6 months, or 1 year prior to the pollinating. In one embodiment, the pollinating produces at least about 1 seed per 5 mg of pollen used for the pollinating. In another embodiment, the pollinating produces a substantially equivalent number of seeds compared to the number of seeds produced from pollination under the same conditions but using pollen that was not stored. In yet another embodiment, the method further comprises collecting seed resulting from the pollinating. In still yet another embodiment, the method further comprises crossing a progeny plant grown from the seed with itself or a second plant. In one embodiment, the method further comprises repeating the steps of (a) obtaining pollen that has been stored in a pollen storage solution according to the present invention; and (b) pollinating the plant with the pollen, on two or more consecutive days. In another embodiment, the pollinating comprises manually applying or spraying the pollen onto a female reproductive part of the plant.

BRIEF DESCRIPTION OF DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Modern plant breeding relies on outcrossing or cross-pollination to generate progeny plants having specific heritable traits. Such breeding strategies play an important role in $F_1$ population development and trait integration. Corn (Zea mays), rice (Oryza sativa), wheat (Triticum aestivum), and sorghum (Sorghum bicolor), which belong to the Poaceae family and the Liliopsida class (monocots) of plants, are examples of economically important agricultural crops in which breeding has been hampered by low efficiency procedures in controlled cross-pollination. Further, in plants that exhibit hybrid vigor (heterosis), such as corn, commercial seed sold to farmers is typically F1 hybrid seed, and therefore such limitations not only impact development of new varieties during plant breeding, but also hamper efforts to produce seed for use by farmers in sufficient quantities and in an economical manner.

Pollen of plants from the Poaceae family is classified as recalcitrant or desiccation sensitive as described in Pacini and Dolferus, *Frontiers in Plant Sci.* 10:679; 2019. Other non-limiting examples of recalcitrant pollen include pollen of certain species in the Alismataceae, Amaranthaceae, Cactaceae, Chenopodiaceae, Cucurbitaceae, Anacardiaceae, Portulacaceae, Urticaceae, Lauraceae, Liliaceae, Iridaceae, Orchidaceae, Acanthaceae, and Caryophyllaceae families (Pacini and Dolferus, 2019). Conventional methods for cross pollination of such species, for example corn, entails emasculation of female plants and interspersing rows of male parent plants. This process is inefficient as it depends on the effective flow of pollen to the female plants, which is vulnerable to wind and requires that the male and female plants enter the reproductive phase at the same time. Alternatively, hand pollination may be used, but is highly labor intensive.

Storage of pollen in a manner that maintains viability and fertility would allow for pollination that does not depend on active pollen shed, temporal synchrony with female flower receptivity, or the use of male sterility. Pollen viability often decreases rapidly once it is shed, and pollen from the Poaceae family of plants, such as corn (Zea mays), rice (Oryza sativa), wheat (Triticum aestivum), and sorghum (Sorghum bicolor), remains viable for a particularly short time period. Therefore, improved methods to maintain pollen viability and fertility during storage are needed and are of significant value to the agricultural industry.

The invention represents a significant advancement in the art in that it permits reproducible and successful pollen storage for significant periods of time, such as for at least about a week, month, 6 months, year, 5 years, or even 10 years or more. The reproducible, successful long-term storage of pollen and in particular, recalcitrant or monocot pollen, has not previously been feasible. The current invention, however, overcomes the limitations of the prior art to allow for reproducible long-term pollen storage. The solutions and methods described herein may therefore be used to permit pollen to be stored long-term and then later used in breeding programs or for field seed production, thereby preserving unique genetic resources and allowing the overall genetic diversity of a plant breeding program to be significantly increased.

The current invention may be used to permit cross-pollination with stored pollen, thus eliminating the need for in-field synchronized male and female plant development, and minimizing the effects of variable weather conditions. The present disclosure therefore may permit implementation of high-throughput methods for the delivery of stored donor pollen to a recipient female reproductive part of a plant. The methods provided herein would therefore substantially reduce the time and labor previously required to facilitate cross-pollination in plants. This is of particular significance as modern plant breeding programs may require tens of thousands or even hundreds of thousands of individual crosses or more on a yearly basis in order to produce new plant varieties with improved traits.

Pollen Storage Solutions

In one aspect, the present invention provides a pollen storage solution comprising pollen, a solute that maintains the tonicity of the pollen storage solution at a concentration between about 0.5M and about 3.0M, and a cryoprotectant, wherein the solute is impermeable to the pollen in the solution and wherein the cryoprotectant is permeable to the pollen in the solution. The term "about" is used herein to indicate that a value includes the standard deviation of the mean for the method or device being employed to determine the value. "Tonicity" as used herein is influenced by solutes that cannot cross the membrane. Solutes that are able to freely cross the membrane do not influence tonicity because they equilibrate across the membrane without net solvent movement. As used herein the term "impermeable" refers to a state where an isotonic solution of the solute when first mixed with pollen produces less than about 10% pollen lysis over the first 4 hours that the pollen is in contact with the solution. As used herein the term "permeable" refers to a state where an isotonic solution of the cryoprotectant when first mixed with pollen produces greater than 50% pollen lysis over the first 4 hours that the pollen is in contact with the solution. As used herein the term "isotonic" refers to a state where the osmolarity of the extracellular solution is equal to the osmolarity of the pollen cytoplasmic space. As used herein, "pollen" refers to at least one pollen grain and includes a plurality of pollen grains. Non-limiting examples of pollen that may find use according to the solutions and methods of the invention include recalcitrant pollen, pollen collected from a dicot plant, a monocot plant, a cereal plant, a Poaceae family plant, an Alismataceae family plant, an Amaranthaceae family plant, a Cactaceae family plant, a Chenopodiaceae family plant, a Cucurbitaceae family plant, a Anacardiaceae family plant, a Portulacaceae family plant, a Urticaceae family plant, a Lauraceae family plant, a Liliaceae family plant, a Iridaceae family plant, a Orchidaceae family plant, a Acanthaceae family plant, a Caryophyllaceae family plant, a corn plant, a rice plant, a wheat plant, a sorghum plant, or a canola plant. As used herein "recalcitrant pollen" refers to desiccation sensitive pollen as described in Pacini and Dolferus (*Frontiers in Plant Sci.* 10:679; 2019). As used herein a "cereal plant" refers to grass plant cultivated for the edible components of its grain. Pollen that may be used in the compositions and methods described herein includes pollen collected from virtually any plant. In specific embodiments, the pollen may be diploid, double haploid, transformed, or pollen collected from a $T_0$ transformed plant.

In general, it will be desirable to use a pollen storage solution containing components that maintain high viability and fertility of pollen in the solution during long-term storage. In some embodiments, the pollen storage solution comprises about 2% to about 40% pollen by weight. The pollen suspension solution may comprise, for example, about 0.5%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, or 40% pollen by weight. Pollen for use in the present invention may be obtained using any manual or automated methods well known in the art. In certain embodiments, pollen may be fresh, or may be dried or partially dried, prior to being added to the solution.

In some embodiments, the solute present in a solution according to the invention is present at a concentration of between about 0.5M and about 3.0M. The solute may be present in the solution, for example, at a concentration of about 0.5M, 1.0M, 1.5M, 2.0M, 2.5M, or 3.0M, including all ranges derivable therebetween. Non-limiting examples of solutes that may be used in the production of such a solution include a monosaccharide solute, a disaccharide solute, a polysaccharide solute, a polyhydric alcohol solute, a polyethylene glycol solute, glucose, fructose, galactose, sucrose, lactose, maltose rehalose, cellobiose, chitobiose, kojibiose, nigerose, isomaltose, trehalose, sophorose, laminaribiose, gentiobiose, trehalulose, turanose, maltulose, leucrose, isomaltulose, gentiobiulose, mannobiose, melibiose, melibiulose, rutinose, rutinulose, xylobiose, maltotriose, melezitose, nigerotriose, maltotriulose, raffinose, kestose, maltodextrin, starch, glycogen, galactogen, cellulose, chitin, pectin, peptidoglycan, mannitol, sorbitol, xylitol, lactitol, isomalt, maltitol, sodium chloride, or polyethylene glycol.

In one embodiment, a pollen storage solution provided herein comprises a cryoprotectant present at a concentration between about 0.5M and about 5.0M. The cryoprotectant may be present in the solution, for example, at a concentration of about 0.5M, 1.0M, 1.5M, 2.0M, 2.5M, 3.0M, 3.5M, 4.0M, 4.5M, or 5.0M, including all ranges derivable therebetween. Non-limiting examples of cryoprotectants that may be used in the production of a pollen storage solution according to the present invention include ethylene glycol, dimethyl sulfoxide, butanediol, propylene glycol, betaine, acetamide, formamide, and glycerol. In specific embodiments, the pollen storage solution may be defined as an aqueous solution or as an isotonic solution.

A pollen storage solution of the invention may, for example, comprise additional components that contribute to the viability and fertility of the pollen following storage. Non-limiting examples of such components include amino acids, lipids, vitamins, electrolytes, macronutrients, micronutrients, energy sources, buffers, cytokinins, auxins, organic extracts, and gibberellins. Amino acids that may be used in the pollen storage solution may be provided in the form of casein hydrolysate or may be provided individually. Vitamins that may be used in the pollen storage solution include, but are not limited to, thiamine, riboflavin, niacin, pyridoxine, folic acid, pantothenic acid, biotin, ascorbic acid, myo-inositol, para amino benzoic acid, vitamin E, thiamin ($B_1$), nicotinic acid, and pyridoxine ($B_6$). Macronutrients that may be used in the pollen storage solution include, but are not limited to, nitrogen, potassium, phosphorus, calcium, and magnesium. Micronutrients that may be used in the pollen storage solution include, but are not limited to, cobalt, iodine, iron, molybdenum, zinc, boron, and manganese. Organic extracts include substances extracted from natural sources, non-limiting examples of which include protein hydrolysates, coconut milk, yeast extract, malt extract, ground banana, orange juice, and tomato juice. Cytokinins that may be used in the present invention include, but are not limited to, BAP (6-benzyloaminopurine), 2iP (6-dimethylaminopurine), Kinetin (N-2-furanylmethyl-1H-purine-6-amine), Zeatin (6-4-hydroxy-3-methyl-trans-2-butenylaminopurine), and TDZ (thiazuron-N-phenyl-N-1,2,3 thiadiazol-5ylurea). Non-limiting examples of auxins that may be used in the present invention include indole acetic acid (IAA), indole-3-butyric acid (IBA), 2,4-dichlorophenoxy-acetic acid (2,4-D), and naphthalene-acetic acid (NAA). Gibberellins are tetracyclic diterpenoid carboxylic acids that function as growth regulators, a non-limiting example of which is gibberellin A3.

Storing Plant Pollen

In another aspect, the invention provides a method of storing pollen in a pollen storage solution comprising pollen, a solute that maintains the tonicity of the pollen storage solution at a concentration between about 0.5M and about 3.0M, and a cryoprotectant; wherein the solute is impermeable to the pollen in the solution and wherein the cryoprotectant is permeable to the pollen in the solution. In some embodiments, the conditions of the storage method may be optimized for a particular application or particular pollen type. Such parameters can be determined empirically using the methodology described herein. To promote cross-pollination, for example, it may be desired to use a pollen storage solutions and methods that contain components that facilitate cryopreservation, maintain high viability of the pollen grains, and which do not significantly hinder fertilization and seed development following storage. Non-limiting examples of pollen that may be used according to the solutions and methods of the invention include recalcitrant pollen, pollen collected from dicot plant, a monocot plant, a cereal plant, a Poaceae family plant, an Alismataceae family plant, an Amaranthaceae family plant, a Cactaceae family plant, a Chenopodiaceae family plant, a Cucurbitaceae family plant, a Anacardiaceae family plant, a Portulacaceae family plant, a Urticaceae family plant, a Lauraceae family plant, a Liliaceae family plant, a Iridaceae family plant, a Orchidaceae family plant, a Acanthaceae family plant, a Caryophyllaceae family plant, a corn plant, a rice plant, a wheat plant, a sorghum plant, or a canola plant.

In certain embodiments, storing may performed at a temperature between about −196° C. and about −60° C. or at a temperature between about −196° C. and about −70° C. The storage temperature may be, for example, about −196° C., −190° C., −180° C., −170° C., −160° C., −150° C., −140° C., −130° C., −120° C., −110° C., −100° C., −90° C., −80° C., −76° C., −75° C., −70° C., −65° C., or −60° C., including all ranges derivable therebetween. In some embodiments, the storing is defined as performed for up to about 1 year, 5 years, 10 years, 15 years, 20 years, 25 years, or 30 years or more, including all ranges derivable therebetween. In other embodiments, the storing may be performed for at least about 15 minutes, 1 hour, 12 hours, 1 day, 1 week, 1 month, 6 months, 1 year, 2 years, 5 years, 7 years, or 10 years or more, including all ranges derivable therebetween. In one embodiment, the pollen is recalcitrant pollen or is pollen from a monocot plant. In another embodiment, the pollen is capable of germination following storing. In yet another embodiment, at least about 5% of pollen grains in the solution remain capable of germination on a stigma following the storing. In particular embodiments, at least about 1%, 2%, 3%, 4%, 5%, 6%, 7%, 8%, 9%, 10%, 11%, 12%, 13%, 14% 15%, 20%, 25%, or 50% of pollen grains in the solution remain capable of germination on the stigma following the storing. Assays to determine percent germination on the stigma are routine in the art. As one example, pollen may be applied to the stigma, incubated, fixed, stained using aniline blue, and visualized using UV dark field (Sari Gorla, et al., *Theoretical and Applied Genetics*, 46:289-294; 1975), specifically incorporated herein by reference.

In one aspect, a method for evaluating pollen viability is provided herein comprising: (a) obtaining pollen; (b) delivering the pollen to a female reproductive part of a recipient plant; (c) washing the female reproductive part of the recipient plant to remove non-adhered pollen; and (d) evaluating adherence of the pollen to said female reproductive part of said recipient plant. In one embodiment, the method comprises fixing the adhered pollen to the female reproductive part of the recipient plant prior to step (d). In another embodiment, the evaluating is quantitative. In yet another embodiment, the evaluating comprises counting the number of pollen grains adhered to the female reproductive part of said recipient plant. Fertile pollen from virtually any plant may be evaluated using the methods described herein. Non-limiting examples of which include plants with recalcitrant pollen, dicot plants, monocot plants, cereal plants, Poaceae family plants, Alismataceae family plants, Amaranthaceae family plants, Cactaceae family plants, Chenopodiaceae family plants, Cucurbitaceae family plants, Anacardiaceae family plants, Portulacaceae family plants, Urticaceae family plants, Lauraceae family plants, Liliaceae family plants, Iridaceae family plants, Orchidaceae family plants, Acanthaceae family plants, Caryophyllaceae family plants, corn plants, rice plants, wheat plants, sorghum plants, and canola plants. In specific embodiments, the pollen may be diploid, double haploid, transformed, or pollen collected from a $T_0$ transformed plant.

Delivery of Stored Pollen for Pollination of Plants

The present invention surprisingly permits cross-pollination of pollen that is sensitive to environmental conditions that has nonetheless been stored prior to the pollination, even for significant periods of time. Such methods provided herein include obtaining pollen that has been stored in a pollen storage solution as described herein. In some embodiments, the methods of the invention may be optimized for a particular application, particular plant species, or particular pollen type. Such parameters can be determined empirically using the methodology described herein. Non-limiting examples of plants that may be used according to the methods of the invention include plants with recalcitrant pollen, dicot plants, monocot plants, cereal plants, Poaceae family plants, Alismataceae family plants, Amaranthaceae family plants, Cactaceae family plants, Chenopodiaceae family plants, Cucurbitaceae family plants, Anacardiaceae family plants, Portulacaceae family plants, Urticaceae family plants, Lauraceae family plants, Liliaceae family plants, Iridaceae family plants, Orchidaceae family plants, Acanthaceae family plants, Caryophyllaceae family plants, corn plants, rice plants, wheat plants, sorghum plants, and canola plants. In some embodiments, the pollinating comprises manually applying or spraying the pollen onto a female reproductive part of the plant. Non-limiting examples of manual application include applying pollen with a cotton swab or small brush to the female reproductive part of a recipient plant. Spraying may include but is not limited to air-assisted spraying or spraying using a common agricultural nozzle.

In certain embodiments, a pollen storage solution is stored according to the methods described herein prior to pollinating the recipient plant. The pollen storage solution may be stored, for example, for up to about 1 year, 5 years, 10 years, 15 years, 20 years, 25 years, or 30 years or more prior to pollinating. The pollen storage solution may be stored in other embodiments for at least about 15 minutes, 1 hour, 12 hours, 1 day, 1 week, 1 month, 3 months, 6 months, 1 year, 5 years, or 10 years or more prior to the pollinating. The pollen storage solution may be stored at a temperature between about −196° C. and about −60° C. prior to the pollinating. The storage temperature may be, for example, about −196° C., −190° C., −180° C., −170° C., −160° C., −150° C., −140° C., −130° C., −120° C., −110° C., −100° C., −90° C., −80° C., −75° C., −70° C., −65° C., or −60° C.

To promote cross-pollination, it may be desired to use a pollen storage solution containing components that facilitate cryopreservation, maintain high viability of the pollen grains, and which do not significantly hinder fertilization and seed development following storage. Examples of such pollen storage solutions are provided herein. Components of such pollen storage include but are not limited to a solute that maintains the tonicity of the pollen storage solution at a concentration between about 0.5M and about 3.0M, and a cryoprotectant, wherein the solute is impermeable to the pollen in the solution and wherein the cryoprotectant is permeable to the pollen in the solution.

In particular embodiments, the methods described herein are defined as capable of producing at least about 1 seed, 5 seeds, 10 seeds, 15 seeds, 20 seeds, 25 seeds, 30 seeds, 35 seeds, 40 seeds, 45 seeds, 50 seeds, 55 seeds, 60 seeds, 65 seeds, 70 seeds, 75 seeds, 80 seeds, 85 seeds, 90 seeds, 95 seeds, or 100 seeds per 5 mg of pollen used for the pollinating, such as by hand pollination, air-assisted spraying, or spraying using a common agricultural nozzle. Production of even a single seed is considered a success regardless of the amount of pollen required in particular plant breeding applications. For example, recovery of a single seed could rescue a crop line that otherwise would have been lost. Production of a single seed may also be used to produce a new crop line having a particular desired trait. In particular embodiments, the methods described herein are defined as capable of producing at least 1 seed. In other embodiments, the methods described herein are defined as capable of producing at least about 1 seed per 5 mg, 10 mg, 20 mg, 30 mg, 40 mg, or 50 mg of pollen used for the pollinating. In one embodiment, the pollinating is defined as producing a substantially equivalent number of seeds compared to the number of seeds produced from pollination under the same conditions but using pollen that was not stored. Substantial equivalence is evaluated by comparing seed sets produced using pollen stored according to the methods provided herein to seed sets produced using pollen that was not stored. As used herein, "substantially equivalent" refers to a characteristic wherein the mean value±standard deviation of the test population does not deviate more than about 20% from the mean value±standard deviation of the control population.

The step of collecting seed resulting from pollinating with pollen stored in a pollen storage solution of the invention may also be carried out. In a particular embodiment, a progeny plant produced from the collected seed may be crossed with itself or a different plant. In certain embodiments, a method of producing hybrid seed is provided herein comprising producing a pollen storage solution of the invention, delivering the pollen storage solution onto a female reproductive part of a recipient plant, thereby pollinating the female reproductive part with the pollen from the donor plant, harvesting seed produced from the pollination; and identifying hybrid progeny. Selecting a progeny seed or plant that results from pollinating with pollen stored in the pollen storage solution may also performed. Identifying and selecting progeny could be facilitated by use of a polymorphic marker allele contained in the pollen donor that serves to identify progeny plants or seeds of that donor. Morphological markers or biochemical/protein markers have commonly been used as tools for selection of plants with desired traits in breeding. Molecular marker techniques that have been extensively used and are particularly promising for application to plant breeding include: restriction fragment length polymorphisms (RFLPs), amplified fragment length polymorphisms (AFLPs), random amplified polymorphic DNA (RAPD), microsatellites or simple sequence repeats (SSRs), and single nucleotide polymorphisms (SNPs) (Al-Khayri, et al., *Advances in Plant Breeding Strategies,* 2016).

In yet another embodiment, the method further comprises repeating the steps of (a) obtaining pollen that has been stored in a pollen storage solution according to the present invention; and (b) pollinating the plant with the pollen, on two or more consecutive days. These steps may be repeated, for example, on two consecutive days, three consecutive days, four consecutive days, or on five or more consecutive days. In corn, for example, it can be found that repeating the delivering steps on two or three consecutive days can result in higher seed set.

In still other embodiments, the methods described herein may comprise pollination of flowers that are male sterile at the time of pollinating. Depending upon the developmental stage of the plant, donor pollen applied for cross-pollination could compete with pollen produced by the recipient plant. In order to improve the efficacy of the cross-pollination, it may be advantageous in some cases that the recipient plant be male sterile in an effort to reduce competition with selfing. Thus, a male sterility system could be employed with the female parent plant in a particular cross. Many such male sterility systems are well known, including cytoplasmic male sterility (CMS) and genic male sterility (GMS). CMS and GMS facilitate hybrid seed production for many crops and thus allow breeders to harness yield gains associated with hybrid vigor. The use of a gametocide presents an alternative method to produce male sterility. Gametocides affect processes or cells involved in the development, maturation or release of pollen. Plants treated with such gametocides are rendered male sterile, but typically remain female fertile. The use of chemical gametocides is described, for example, in U.S. Pat. No. 4,936,904, the disclosure of which is specifically incorporated herein by reference in its entirety. Furthermore, the use of Roundup herbicide in combination with glyphosate tolerant corn plants to produce male sterile corn plants is disclosed in PCT Publication WO 98/44140. Several gametocides have been reported effective in inducing pollen sterility in various crops and are well known in the art. Such gametocides include sodium methyl arsenate, 2,3-dichloroisobutyrate, sodium 2,2-dichloropropionate, gibberellic acid, maleic hydrazide (1,2-dihydropyridazine, 3-6-dione), 2,4-dichloro phenoxy acetic acid, ethyl 4-fluorooxanilate, trihalogenated methylsulfonamides, ethyl and methyl arsenates (Ali et al., *Genetics Plant Breeding,* 59:429-436, 1999). Physical emasculation of the recipient plant presents another alternative to produce male sterility. Following emasculation, the plants are then typically allowed to continue to grow and natural cross-pollination occurs as a result of the action of wind, which is normal in the pollination of grasses, including corn. As a result of the emasculation of the female parent plant, all the pollen from the male parent plant is available for pollination because the male reproductive portion, and thereby pollen bearing parts, have been previously removed from all plants of the plant being used as the female in the hybridization. Of course, during this hybridization procedure, the parental varieties are grown such that they are isolated from other plants to minimize or prevent any accidental contamination of pollen from foreign sources. These isolation techniques are well within the ability of those skilled in this art.

The methods disclosed herein may be implemented for improved cross-pollination of potentially any plants. Such plants can include, but are not limited to, cereal plants, non-limiting examples of which are corn, wheat, rice, and sorghum.

Modified Plants and Seeds

One aspect of the invention provides selection of progeny plants and seeds that result from the methods described herein. In some embodiments, the progeny plants and seeds may be defined as comprising a detectable modification relative to the female parent plant. One method of producing such plants and seeds is through use of an allele produced by plant genetic transformation. Suitable methods for transformation of host plant cells for use with the current invention are well known in the art and include any method by which DNA can be introduced into a cell (for example, where a recombinant DNA construct is stably integrated into a plant chromosome) and are well known in the art. Some widely utilized methods for cell transformation are *Agrobacterium*-mediated transformation, microprojectile bombardment-mediated transformation, and cell penetrating peptide-mediated delivery of DNA modifying agents.

Another method of producing modified plants and seeds is through genome editing. As used herein, the term "genome editing" refers to the use of genome editing methods and a site-specific genome modification enzyme to modify a nucleotide sequence. In some embodiments, donor pollen may be transformed using techniques known in the art to contain one or more reagents that mediate genome-specific modification in a plant. Pollen grains may be used in accordance with the invention that comprise any such reagents of loci generated with use of such reagents at any current or prior generation.

Suitable methods for altering a wild-type DNA sequence at a pre-determined chromosomal site include any method known in the art. Targeted modification of plant genomes through the use of genome editing methods and reagents can be used to create improved plant lines through modification of plant genomic DNA. In addition, genome editing methods and reagents can facilitate targeted insertion of one or more nucleic acids of interest into a plant genome. Exemplary methods for introducing donor polynucleotides into a plant genome or modifying the genomic DNA of a plant include the use of genome editing reagents such as: sequence-specific recombinases, endonucleases, zinc-finger nucleases, engineered or native meganucleases, TALE-endonucleases, RNA-guided endonucleases (for example, a Clustered Regularly Interspersed Short Palindromic Repeat (CRISPR)/Cas9 system, a CRISPR/Cpf1 system, a CRISPR/CasX system, a CRISPR/CasY system, a CRISPR/Cascade system), and CRISPR-associated transposases (Strecker, et al., *Science*, 365(6448):48-53, 2019) and (Klompe, et al., *Nature*, 571: 219-225, 2019). Several embodiments relate to methods of genome editing using single-stranded oligonucleotides to introduce precise base pair modifications in a plant genome, as described by Sauer et al. (*Plant Physiol.* 170(4):1917-1928; 2016).

As used herein, the term "site-specific genome modification enzyme" refers to any enzyme that can modify a nucleotide sequence in a sequence-specific manner. In some embodiments, a site-specific genome modification enzyme modifies the genome by inducing a single-strand break. In some embodiments, a site-specific genome modification enzyme modifies the genome by inducing a double-strand break. In some embodiments, a site-specific genome modification enzyme comprises a cytidine deaminase. In some embodiments, a site-specific genome modification enzyme comprises an adenine deaminase. In the present disclosure, site-specific genome modification enzymes include endonucleases, recombinases, transposases, deaminases, helicases and any combination thereof. In some embodiments, the site-specific genome modification enzyme is a sequence-specific nuclease.

EXAMPLES

Example 1. Development of Pollen Storage Solutions

Figure 1:
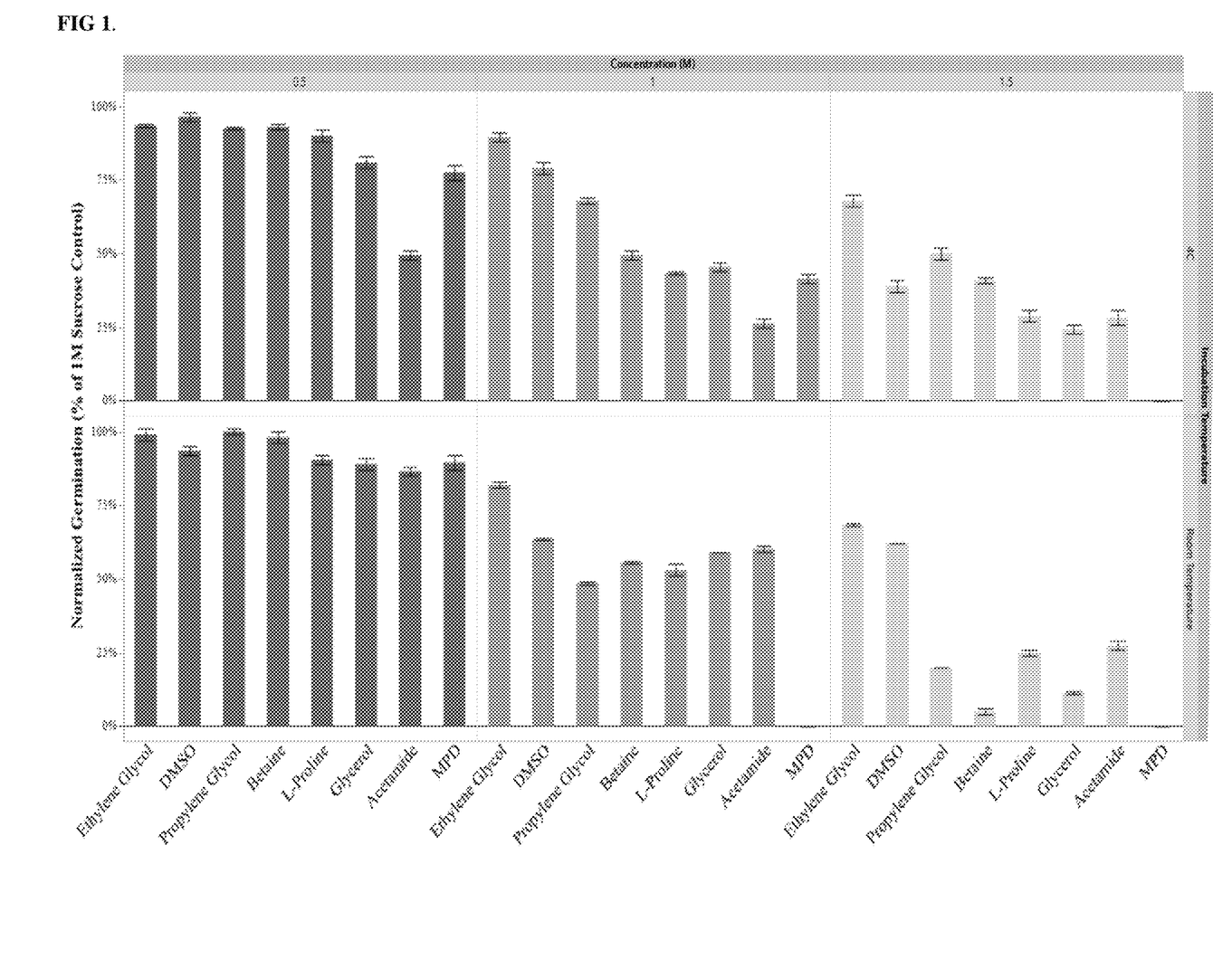
FIG. 1 demonstrates the germination of corn pollen following incubation in various pollen storage solutions.

Pollen grains may be obtained from a donor plant and stored as a pollen storage solution prior to pollination of a recipient plant. The components and concentrations in the pollen storage solution are important to the efficacy of the solution, as they influence not only the pollen viability but also the success rate of hybrid seed production in pollinated plants. While efficiency can be improved by optimization of the components and concentrations in a given pollen storage solution, numerous substitutions and modifications are possible while still achieving pollination. Tests were performed to develop a pollen storage solution that facilitates cryopreservation, maintains high viability of the pollen grains, and which does not significantly hinder fertilization and seed development following storage. The pollen permeability of numerous cryoprotectants was evaluated to initially identify suitable candidates for use in the pollen storage solution. Suitable cryoprotectants will be permeable to the pollen in the solution. Suitable solutes will maintain the tonicity of the pollen storage solution at a concentration between about 0.5M and about 3.0M. Based on the results of the permeability test, a number of cryoprotectants were further evaluated for pollen toxicity, including acetamide betaine, dimethyl sulfoxide (DMSO), ethylene glycol, glycerol, 2-Methyl-2,4-pentanediol (MPD), and propylene glycol. Pollen storage solutions comprising 1.0M sucrose, 10 mM MES, and 0.5M, 1.0M, or 1.5M of cryoprotectant were evaluated for pollen toxicity. Briefly, corn pollen was suspended in each pollen storage solution at either room temperature or 4° C. and incubated for 15 minutes. The pollen storage solutions were applied to standard germination plates using an airbrush and images of the plates were obtained to evaluate germination. A 1.0M solution of sucrose was used as the positive control. No significant differences in germination were observed between samples incubated at room temperature or 4° C. DMSO and ethylene glycol exhibited the highest germination rates across all concentrations tested (FIG. 1). Interestingly, DMSO and ethylene glycol were among the most permeable cryoprotectants tested. When pollen is initially suspended in the pollen storage solution, the solution is hypertonic, resulting in water influx into the cell. As the cryoprotectant enters the cell, the osmotic gradient between the extracellular and intracellular space decreases and water flux slows. As a result, more permeable cryoprotectants, which penetrate more rapidly, minimize osmotic shock, whereas the less permeable cryoprotectants result in greater osmotic shock. The toxicity of all cryoprotectants and in particular, less permeable cryoprotectants, may be reduced by exposing pollen to increasing concentrations of the cryoprotectant in a stepwise fashion over time to decrease osmotic shock.

Example 2. Analysis of Pollen Germination on the Stigma

Figure 2:
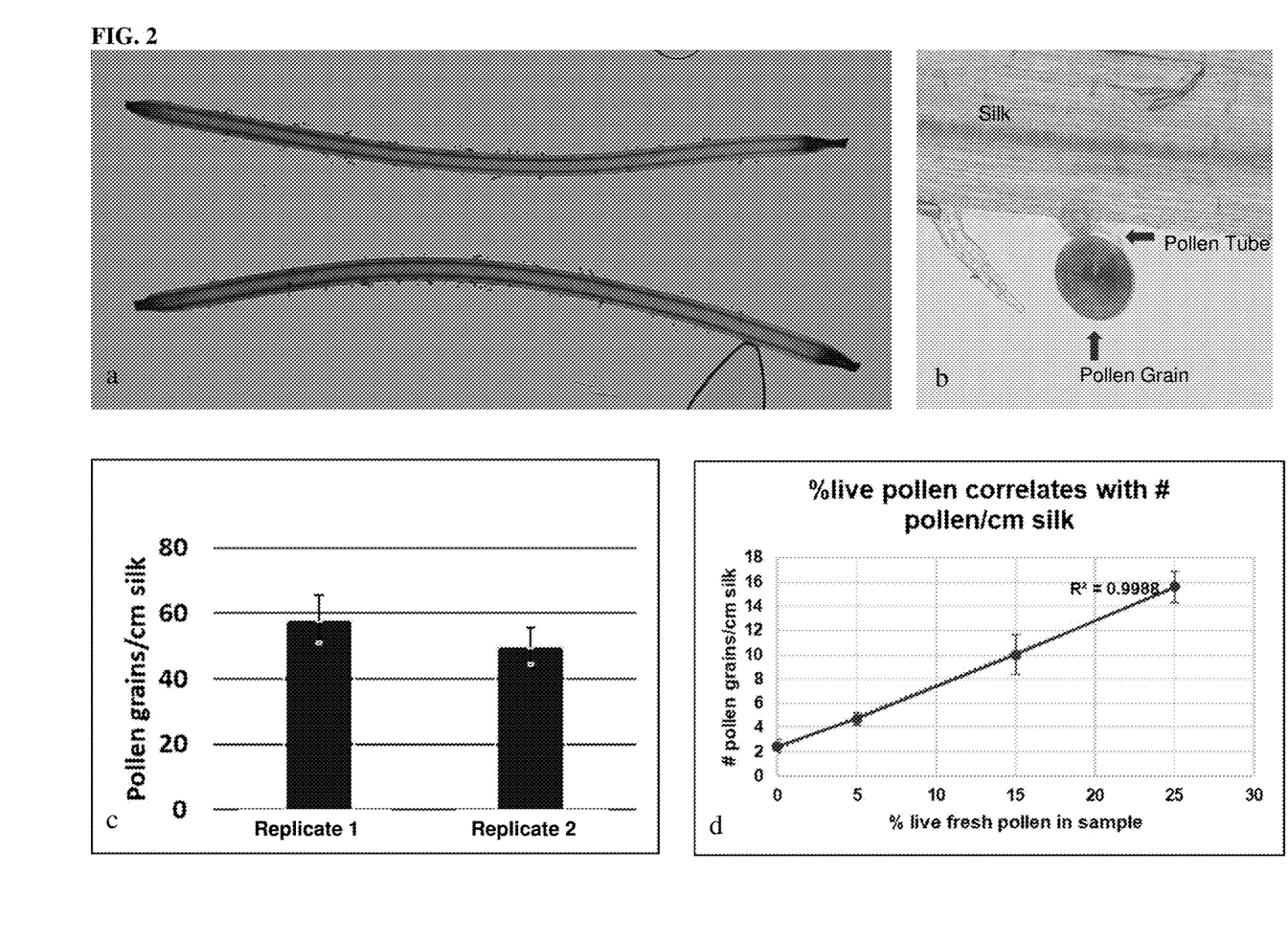
FIG. 2 shows (a-b) microscopic images of corn pollen adhered to corn silks; (c) quantitative data relating to the number of pollen grains adhered per cm silk; and (d) data demonstrating that the percentage of live pollen in a sample directly correlates with the number of pollen grains adhered per cm silk.

Assays to evaluate germination on the stigma are valuable tools used to determine pollen viability and fertility. Qualitative assays to evaluate germination on the stigma are known in the art. As one example, pollen may be applied to the stigma, incubated, fixed, stained using aniline blue, and visualized using UV dark field (Sari Gorla, et al., *Theoretical and Applied Genetics.* 46:289-294; 1975). Germination on the stigma may also be quantitative. For example, pollen may be applied to the stigma, incubated for 1-5 hours, washed, fixed, and visualized using microscopy. In specific embodiments, a brightfield microscope or a stereoscope may be used. Since pollen that has not formed a pollen tube is removed during the wash step, this assay identifies pollen which has formed a pollen tube and is adhered to the stigma. Microscopic images can be obtained and analyzed to determine the number of pollen grains adhered per cm of stigma. In a specific example, corn pollen was added to silks and incubated in a $KNO_3$ chamber for approximately 1 hour at about 25° C. and 96% humidity (Greenspan, *J Res NBS Phys Chem,* 81A:89-96, 1977), washed using a potassium phosphate buffer, fixed using a 3:1 ethanol:acetic acid solution overnight, and visualized using a stereoscope. Microscopic images were obtained and analyzed to determine the number of pollen grains adhered per cm silk (FIG. 2*a-c*). Importantly, the percentage of viable pollen in the sample as determined by mixing fresh, viable pollen with nonviable pollen directly correlates with the number of pollen grains adhered per cm silk (FIG. 2*d*).

Fertile pollen from virtually any plant may be evaluated using the methods described herein. Non-limiting examples of which include plants with recalcitrant pollen, dicot plants, monocot plants, cereal plants, Poaceae family plants, Alismataceae family plants, Amaranthaceae family plants, Cactaceae family plants, Chenopodiaceae family plants, Cucurbitaceae family plants, Anacardiaceae family plants, Portulacaceae family plants, Urticaceae family plants, Lauraceae family plants, Liliaceae family plants, Iridaceae family plants, Orchidaceae family plants, Acanthaceae family plants, Caryophyllaceae family plants, corn plants, rice plants, wheat plants, sorghum plants, and canola plants. In specific embodiments, the pollen may be diploid, double haploid, transformed, or pollen collected from a $T_0$ transformed plant.

Example 3. Analysis of Seed Set Using Stored Corn Pollen

Achieving seed set using stored pollen is challenging. Pollen viability can be lost in minutes to hours after shed depending on the species and environmental conditions. Pollen storage solutions and methods were developed to overcome these challenges. Pollination using the solutions and methods described here may produce at least about 1 seed per 5 mg of pollen used or may produce a substantially equivalent number of seeds compared to the number of seeds produced from pollination under the same conditions but using pollen that was not stored. Seed set is examined but determining the number of seeds produced following pollination. Pollination may be performed, for example, by manually applying or by spraying pollen onto a female reproductive part of a plant. Non-limiting examples of manual application include applying pollen with a cotton swab or small brush to the female reproductive part of a recipient plant and using a measuring spoon to transfer pollen from a container, such as a bag or graduated tube, to the female reproductive part of a recipient plant. Spraying may include but is not limited to air-assisted spraying or spraying using a common agricultural nozzle. The effects of pollen storage in the absence of a pollen storage solution was evaluated by examining seed set following pollination according to one of the following protocols: 1) fresh corn pollen; and 2) stored corn pollen. Stored pollen was stored in a humidity chamber at 4.0° C. and 96.5% humidity with an airflow of 20.0 l/m for 7 days prior to manual pollination. 32 mg of pollen was used for each pollination, and pollinations were performed in quadruplicate. Seed set was evaluated 13 days post pollination. As shown in Table 1, storage in the absence of a pollen storage solution for 7 days significantly reduces the ability of the pollen to set seed (Table 1).

TABLE 1

Seed set following manual pollination using corn pollen stored for 7 days.

| Pollen | Ear 1 | Ear 2 | Ear 3 | Ear 4 | Average |
|---|---|---|---|---|---|
| Fresh pollen | 348 | 363 | 296 | 379 | 346.5 ± 36.0 |
| Stored pollen | 239 | 313 | 265 | 215 | 258.0 ± 42.0 |

What is claimed is:

1. A pollen storage solution comprising:
(a) Poaceae pollen;
(b) a solute that maintains the tonicity of the pollen storage solution at a concentration between about 0.5M and about 3.0M; and
(c) a cryoprotectant;
wherein said solute is impermeable to said pollen in said solution, wherein said cryoprotectant is permeable to said pollen in said solution, and wherein at least about 5% of pollen grains in said pollen storage solution remain capable of germination on a stigma following storage in said pollen storage solution for at least about 1 month.

2. The pollen storage solution of claim 1, wherein:
a) the solute is further defined as a monosaccharide, a disaccharide, a polysaccharide, a polyhydric alcohol, or a polyethylene glycol solute; or
b) the cryoprotectant is:
i) selected from the group consisting of ethylene glycol, dimethyl sulfoxide, butanediol, propylene glycol, betaine, acetamide, formamide, and glycerol; or
ii) present in the solution at a concentration between about 0.5M and about 5.0M.

3. The pollen storage solution of claim 1, wherein the solute is:
a) selected from the group consisting of glucose, fructose, galactose, sucrose, lactose, maltose rehalose, cellobiose, chitobiose, kojibiose, nigerose, isomaltose, trehalose, sophorose, laminaribiose, gentiobiose, trehalulose, turanose, maltulose, leucrose, isomaltulose, gentiobiulose, mannobiose, melibiose, melibiulose, rutinose, rutinulose, xylobiose, maltotriose, melezitose, nigerotriose, maltotriulose, raffinose, kestose, maltodextrin, starch, glycogen, galactogen, cellulose, chitin, pectin, peptidoglycan, mannitol, sorbitol, xylitol, lactitol, isomalt, maltitol, sodium chloride, and polyethylene glycol; or
b) present in the solution at a concentration of between about 0.5M and about 3.0M.

4. The pollen storage solution of claim 3, wherein the solute is sucrose.

5. The pollen storage solution of claim 1, defined as an aqueous solution or an isotonic solution.

6. The pollen storage solution of claim 1, wherein the cryoprotectant is selected from the group consisting of ethylene glycol and dimethyl sulfoxide.

7. The pollen storage solution of claim 1, wherein the Poaceae pollen is from a corn, rice, wheat, or sorghum cereal plant.

8. The pollen storage solution of claim 1, wherein the solution further comprises a component selected from the group consisting of an amino acid, a lipid, a vitamin, an electrolyte, a macronutrient, a micronutrient, an energy source, a buffer, a cytokinin, an auxin, an organic extract, and a gibberellin.

9. A method for storing Poaceae pollen, the method comprising storing Poaceae pollen in the pollen storage solution according to claim 1.

10. The method of claim 9, wherein:
a) the solute is further defined as a monosaccharide, a disaccharide, a polysaccharide, a polyhydric alcohol, or a polyethylene glycol solute;
b) the cryoprotectant is:
i) selected from the group consisting of ethylene glycol, dimethyl sulfoxide, butanediol, propylene glycol, betaine, acetamide, formamide, and glycerol; or
ii) present in the solution at a concentration between about 0.5M and about 5.0M;
c) said storing is:
i) performed at a temperature between about −196° C. and about −70° C.;
ii) performed for up to about 10 years; or iii) performed for at least about 1 hour, 1 day, 1 week, 1 month, 6 months, 1 year, 2 years, 5 years or 7 years; or
d) the pollen storage solution is defined as:
i) an aqueous solution; or
ii) an isotonic solution.

11. The method of claim 9, wherein at least about 10% of pollen grains in said solution remain capable of germination on a stigma following said storing.

12. The method of claim 9, wherein the Poaceae pollen is from a corn, rice, wheat, or sorghum plant.

13. The method of claim 10, wherein the solute is:
a) selected from the group consisting of glucose, fructose, galactose, sucrose, lactose, maltose rehalose, cellobiose, chitobiose, kojibiose, nigerose, isomaltose, trehalose, sophorose, laminaribiose, gentiobiose, trehalulose, turanose, maltulose, leucrose, isomaltulose, gentiobiulose, mannobiose, melibiose, melibiulose, rutinose, rutinulose, xylobiose, maltotriose, melezitose, nigerotriose, maltotriulose, raffinose, kestose, maltodextrin, starch, glycogen, galactogen, cellulose, chitin, pectin, peptidoglycan, mannitol, sorbitol, xylitol, lactitol, isomalt, maltitol, sodium chloride, and polyethylene glycol; or
b) present in the solution at a concentration of between about 0.5M and about 3.0M.

14. The method of claim 13, wherein the solute is sucrose.

15. The method of claim 9, wherein the cryoprotectant is selected from the group consisting of ethylene glycol and dimethyl sulfoxide.

16. The method of claim 9, wherein the solution further comprises a component selected from the group consisting of an amino acid, a lipid, a vitamin, an electrolyte, a macronutrient, a micronutrient, an energy source, a buffer, a cytokinin, an auxin, an organic extract, and a gibberellin.

17. A method for pollinating a Poaceae plant, the method comprising the steps of:
(a) obtaining Poaceae pollen that has been stored in the pollen storage solution of claim 1; and
(b) pollinating said Poaceae plant with said Poaceae pollen.

18. The method of claim 17, wherein:
a) the solute is further defined as a monosaccharide, a disaccharide, a polysaccharide, a polyhydric alcohol, or a polyethylene glycol solute;
b) said pollen storage solution was;
i) stored for up to about 10 years prior to said pollinating; or
ii) stored for at least about 1 hour, 1 day, 1 week, 1 month, 3 months, 6 months, or 1 year prior to said pollinating;
c) the pollen storage solution is defined as;
i) an aqueous solution; or
ii) an isotonic solution; or
d) the cryoprotectant is:
i) selected from the group consisting of ethylene glycol, dimethyl sulfoxide, butanediol, propylene glycol, betaine, acetamide, formamide, and glycerol; or
ii) present in the solution at a concentration between about 0.5M and about 5.0M.

19. The method of claim 17, wherein the Poaceae pollen is from a corn, rice, wheat, or sorghum plant.

20. The method of claim 17, wherein the solute is:
a) selected from the group consisting of glucose, fructose, galactose, sucrose, lactose, maltose rehalose, cellobiose, chitobiose, kojibiose, nigerose, isomaltose, trehalose, sophorose, laminaribiose, gentiobiose, trehalulose, turanose, maltulose, leucrose, isomaltulose, gentiobiulose, mannobiose, melibiose, melibiulose, rutinose, rutinulose, xylobiose, maltotriose, melezitose, nigerotriose, maltotriulose, raffinose, kestose, maltodextrin, starch, glycogen, galactogen, cellulose, chitin, pectin, peptidoglycan, mannitol, sorbitol, xylitol, lactitol, isomalt, maltitol, sodium chloride, and polyethylene glycol; or
b) present in the solution at a concentration of between about 0.5M and about 3.0M.

21. The method of claim 20, wherein the solute is sucrose.

22. The method of claim 17, wherein the cryoprotectant is selected from the group consisting of ethylene glycol and dimethyl sulfoxide.

23. The method of claim 17, wherein:
a) the solution further comprises a component selected from the group consisting of an amino acid, a lipid, a vitamin, an electrolyte, a macronutrient, a micronutrient, an energy source, a buffer, a cytokinin, an auxin, an organic extract, and a gibberellin; or
b) said pollinating produces;
i) at least about 1 seed per 5 mg of pollen used for said pollinating; or
ii) a substantially equivalent number of seeds compared to the number of seeds produced from pollination under the same conditions but using pollen that was not stored.

24. The method of claim 17, further comprising:
a) collecting seed resulting from said pollinating; or
b) repeating said steps (a) and (b) on two or more consecutive days.

25. The method of claim 24, further comprising crossing a progeny plant grown from seed resulting from said pollinating with itself or a second plant.

26. The method of claim 17, wherein said pollinating comprising manually applying or spraying said pollen onto a female reproductive part of said plant.

* * * * *

UNITED STATES PATENT AND TRADEMARK OFFICE
CERTIFICATE OF CORRECTION

PATENT NO. : 11,910,794 B2
APPLICATION NO. : 17/680781
DATED : February 27, 2024
INVENTOR(S) : Zachary Boyer et al.

It is certified that error appears in the above-identified patent and that said Letters Patent is hereby corrected as shown below:

In the Claims

Column 14, Claim 7, Line 43 delete "Poaceae pollen is from a corn, rice, wheat, or sorghum cereal" and insert --Poaceae pollen is from a corn, rice, wheat, or sorghum--

Signed and Sealed this
Eighteenth Day of June, 2024

Katherine Kelly Vidal
*Director of the United States Patent and Trademark Office*